Oct. 20, 1964   F. R. YOUNG   3,153,753
TRIMMER CONDENSER
Filed Jan. 25, 1961
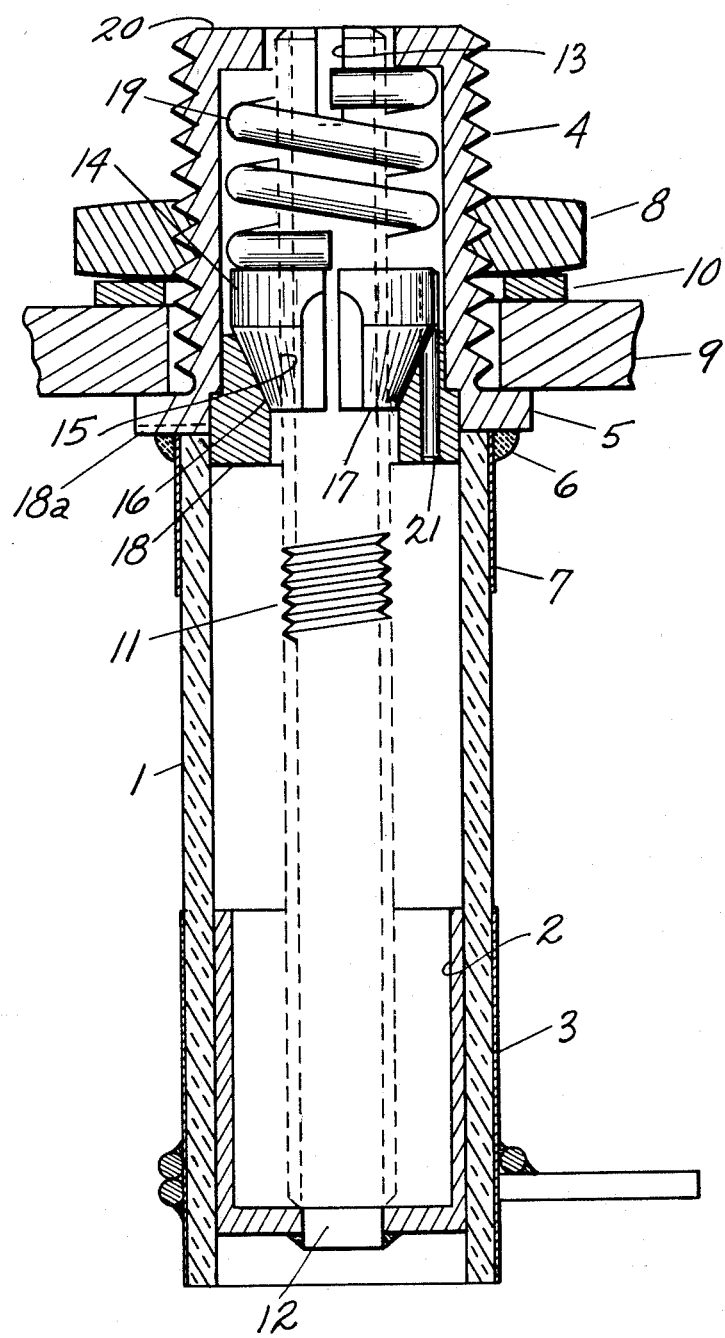
INVENTOR.
Fletcher R. Young
BY Ralph Hammar
Attorney

United States Patent Office 3,153,753
Patented Oct. 20, 1964

3,153,753
TRIMMER CONDENSER
Fletcher R. Young, North East, Pa., assignor to Erie Technological Products, Inc., a corporation of Pennsylvania
Filed Jan. 25, 1961, Ser. No. 84,814
1 Claim. (Cl. 317—249)

This invention is intended to improve the stability of trimmer condensers under temperature cycling and vibration. The construction provides localized friction on the adjusting screw without introducing any forces which would make the adjustment of the trimmer depend in any way upon the pressure or turning force exerted on the adjusting screw during adjustment.

In the drawing, the single figure is a longitudinal section through the condenser.

The trimmer condenser has a tubular dielectric 1 and a metallic plunger 2 longitudinally slidable in the bore of the dielectric. The adjusted capacity of the trimmer is determined by the amount of overlap of the plunger 2 and an external metal electrode 3 at one end of the dielectric. The dielectric and plunger are selected from materials in which the coefficients of thermal expansion are matched so that changes in dimensions with temperature have a minimum effect upon capacity.

The trimmer is mounted by a metal bushing 4 having a flange 5 butting against the end of the dielectric and secured thereto by a solder bead 6 connecting the flange 5 and an external metal coating 7 on the dielectric. The opposite end of the bushing is externally threaded to receive a nut 8 by which the chassis 9 is clamped between the nut and flange to mount the trimmer. A lock washer 10 prevents loosening of the nut.

The longitudinal position of the plunger 2 is adjusted by a screw 11 secured at one end 12 to the plunger 2 and having a screwdriver slot 13 at the opposite end.

The screw extends through wedge members 14 spaced from each other and having internal threads 15 cooperating with the threads of the screw. On the outer surface of the members 14 are wedge surfaces 17 inclined to the axis of the screw 11 at a wedging angle which are urged axially against complementary cooperating inclined wedge surfaces 16 on a collar 18 by a spring 19. The collar 18 projects partly into the bore of the dielectric 1 and is nonrotatably secured to the bushing 4, for example by a press fit or by soldering or by both. The flange 5 may have radial grooves 18a to carry the solder to the joint between the collar 18 and the bushing 4. The spring 19 arranged between an inwardly extending flange 20 on the bushing and the wedge members 14 urges the members 14 against the wedge surfaces 16 and the cooperation of wedge surfaces 16 and 17 urges the wedge members 14 radially inward to grip the screw 11 and takes up any backlash between the threads 15 of the wedge members and the threads of the adjusting screw 11. The force of the spring 19 is multiplied by the mechanical advantage of the inclined wedge surfaces 16 and 17 so that a secure grip is maintained between the threads 15 and the adjusting screw.

The absence of backlash and the very substantial friction between the threads 15 and the threads of the adjusting screw 11 securely holds the adjusting screw in any adjusted position under all conditions. The grip on the threads of the adjusting screw is solely at the threads 15 and accordingly temperature changes do not affect the position of the adjusting screw with respect to the threads 15. The spring 19 does not introduce any torsional reaction which would tend to make the trimmer difficult to adjust. The entire resistance to rotation of the adjusting screw is frictional.

The contour of the inclined wedge surfaces 16 and 17 is not critical. When these surfaces are conical as shown, one of the members 14 is keyed to the member 18 by a pin 21. This pin would not be necessary if the wedge surfaces 16 and 17 were non-circular.

What is claimed as new is:

In a trimmer condenser of the type having a tubular dielectric with an external electrode over part of its length, a metal plunger movable along the bore of the dielectric, a mounting bushing fixed to one end of the dielectric, and an externally threaded adjusting screw within the bore of the tubular dielectric connected to the plunger for positioning the plunger relative to said electrode to adjust the capacity, the improvement which comprises a plurality of wedge members disposed about said screw and spaced from each other and having internal thread surfaces engaging the external thread of the screw and having external wedge surfaces inclined at a wedging angle to the axis of the screw, said bushing having surfaces complementary to the wedge surfaces on the wedge members and converging toward the screw at a wedging angle, the bushing having a spring seat spaced from said wedge members, means keying the wedge members to said bushing and a coil spring surrounding the screw between the spring seat and said wedge members and forcing the wedge members axially against said converging surfaces.

References Cited in the file of this patent
UNITED STATES PATENTS

| | | |
|---|---|---|
| 2,294,745 | Goetz | Sept. 1, 1942 |
| 2,578,608 | Shull | Dec. 11, 1951 |
| 2,708,729 | Shull | May 17, 1955 |
| 2,747,147 | Shull | May 22, 1956 |
| 2,984,776 | Barnes | May 16, 1961 |